United States Patent [19]

Konter

[11] Patent Number: 5,105,653

[45] Date of Patent: Apr. 21, 1992

[54] PRESSURE TESTING DEVICE FOR VEHICLE RADIATORS AND COOLING SYSTEMS

[76] Inventor: Richard J. Konter, 1911 W. Arcade Dr. South, Lake Villa, Ill. 60046

[21] Appl. No.: 655,846

[22] Filed: Feb. 15, 1991

[51] Int. Cl.[5] .......................... G01L 7/00; G01M 3/04
[52] U.S. Cl. ........................................ 73/49.2; 73/40; 73/756
[58] Field of Search ................. 73/756, 37, 40, 45.5, 73/45.8, 49.2, 49.7, 49.8, 45.7, 52

[56] References Cited

U.S. PATENT DOCUMENTS

| | | | |
|---|---|---|---|
| 4,458,523 | 7/1984 | Moyer | 73/49.7 |
| 4,494,402 | 1/1985 | Carney | 73/49.7 |
| 4,667,507 | 5/1987 | Eriksson | 73/49.7 |
| 4,698,999 | 10/1987 | Trick et al. | 73/49.7 |
| 4,809,542 | 3/1989 | Jones | 73/49.7 |

*Primary Examiner*—Donald O. Woodiel

[57] ABSTRACT

A device and the use of, are disclosed for pressure testing the integrity of coolant systems of the internal combustion engine, and more particularly to a compressed air operated pressure tester for performing diagnostic services on water cooled engines and their related components which include the radiator, the coolant flow passages within the engine itself, the pressure type radiator filler cap with available adapters, and the connecting hoses. The device includes a connecting means and restriction component for discharging compressed air into the coolant system with an adjustable pressure relief valve for limiting the maximum pressure.

9 Claims, 2 Drawing Sheets

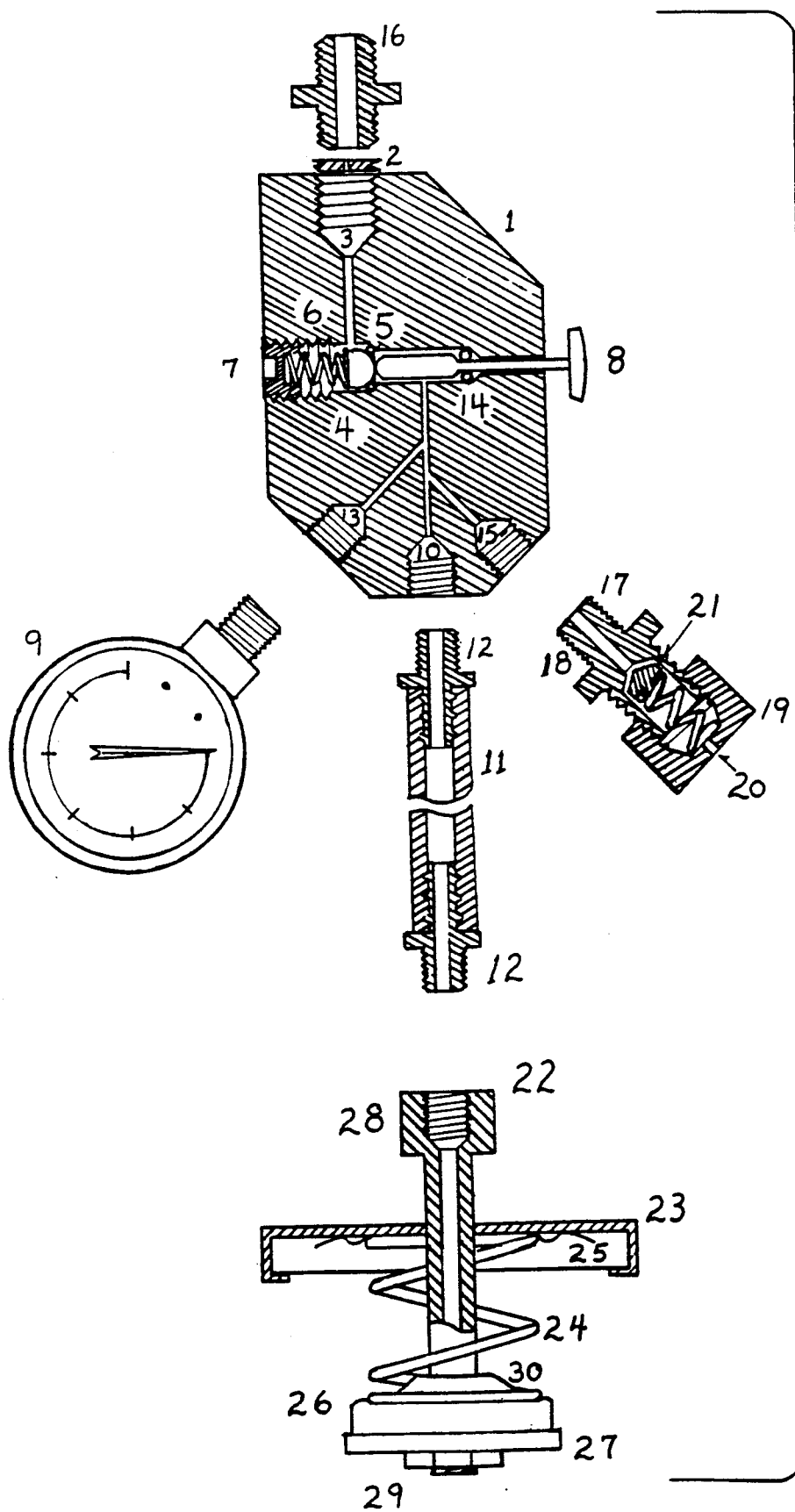

PRESSURE TESTING DEVICE FOR VEHICLE RADIATORS AND COOLING SYSTEMS

BACKGROUND OF THE INVENTION

The present invention relates primarily to pressure testing the coolant systems of the internal combustion engine, and more particularly to a compressed air operated pressure tester for performing diagnostic services on water cooled engines and their related components. Although the invention will be described in that environment, it will become perceptible to those proficient in the trade, that the pressure tester divulged herein may find appropriate uses in other circumstances where it is desired to inspect the pressure integrity of closed systems.

Most internal combustion engines employ a liquid cooling system to maintain the engine within an ideal range for operating efficiency. The fluid typically being water with particular additives. The cooling system of such internal combustion engines generally utilize liquid flow paths that extend within the engine block where heat is transferred from the operating engine to the liquid, through a water pump which circulates the liquid, and then through a radiator where heat transfer occurs between the liquid and the air. With the arrival of higher performance engines, the use of smaller radiators due to costs, design restrictions, and higher operating temperatures for the engines, a substantial amount of heat is generated which has to be dispelled through a comparably small area consisting of the radiator surface. As a result, the majority of these cooling systems operate under pressure. By pressurizing the system, the boiling point of the coolant is raised, resulting in less loss of coolant by evaporation with a relative boost in cooling efficiency.

The amount of pressure formed in these cooling systems depends largely on the temperature of the coolant and the velocity at which the engine is operated. Since the cooling system is designed to be a closed system, any slight leaks existing anywhere in the flow passages will diminish the efficiency of the system and excessive loss of coolant can occur.

As the coolant is lost through such leaks, the efficacy of the system to keep the engine temperature from rising above the ideal operating degree, is consequently decreased. If enough of the coolant is lost, overheating transpires which will more than likely damage the engine.

Therefore, it is recognized that cooling systems of internal combustion engines should be pressure tested periodically to ascertain the presence of leaks by measuring the integrity of the cooling system.

A heater is also incorporated in the cooling system of most vehicles. It is usually located near to or inside of the vehicle. The heater is normally connected to the other parts of the cooling system by a heater supply conduit.

If a leak is shown when using the most commonly used tool, a hand operated air pump and gauge unit, it is not always easy to determine where the leak is located. The typical engine cooling system is liuqid filled except for a small volume of air located at the top of the radiator, the highest point in the cooling system. The air pressure in that segment of the radiator is increased by the hand pump which is connected to the radiator filler neck at the top of the radiator. Consequently, any leak that might be in the air-filled section of the radiator can only be discovered by the presence of escaping air which cannot be seen by visual observation.

It is further hoped that the invention's ease of use will be obvious as compared to the current standard of the industry being a hand pumped unit with limited safety valving. Rather than having the operator manually pump air into the system while having removed himself from any test procedure as he supplies the air for the test.

The invention uses this compressed air supply to make test procedures easy to accomplish, and expand the technician's ability to diagnose the condition of the components of the cooling system. Most vehicle repair shops supply compressed air.

SUMMARY OF THE INVENTION

An object of this invention relates to pressure testing coolant systems on internal combustion engines, particularly devices for testing transportation vehicle cooling systems and their related components. In general the practice is to pressurize the cooling system via a test instrument and while under this pressure, search for and locate leaks in the radiator, hoses, engine, and other related components of the vehicle and/or engine.

An object of this invention takes state of the art to a high tech standing. By using supplied compressed air, running into the valve assembly housing, through a metered inlet orifice, said orifice being designed to limit the amount of air allowed into the valve assembly housing, so as not to pressurize the cooling system too quickly and with the safety valve incorporated in the device limiting pressure. By working together these control the test air volume and pressure in the radiator test side air passages of the invention.

A primary object of the present invention is to provide a pressure testing tool that will overcome the short comings of the prior art devices. Such as allowing for one hand operation. Once the invention is installed using a sufficient length of hose, a separation from the valve assembly housing to the radiator inlet adapter occurs, thus enabling the operator to pressurize the cooling system at a distance from the radiator filler neck.

It is the object of this invention to be a rapid and efficient high tech tool to accurately check cooling systems and related component assemblies for internal and external leakage. Thus allowing the technician to do his job much more efficiently and accurately. Rather than having the operator manually pump air into the system while having removed himself from any test procedure as he supplies the air for the test.

Another object of this invention is it automatically controls the volume of compressed air and releases pressure at a pre-determined amount, so the cooling system can remain pressurized without increasing the test pressure past the cooling system's designed limit. Pressure is controled by the metered inlet orifice and primary safety valve and secondary pressure relief.

Still another object is with current adapters available, this invention is designed to test all but not limited to radiator caps, radiators, and the entire coolant system and related components.

A further object is because this invention uses compressed air this also allows the technician to pressurize (the method for testing) the coolant system, to search for leaks by listening or observing for signs of said leak(s) even at high leakage rates that would be too large for a manual pump to supply the air to the cooling system for a proper test.

More specifically, the preferred embodiment of the radiator pressure tester comprises of 1 ergonomicaly designed valve assembly housing which contains chambers that control and meter the air flow, and regulate pressure.

Another object is to provide a pressure testing tool that uses an established compressed air delivery system coupled to the invention's valve assembly housing, through a connecting hose to a radiator inlet adapter to discharge the compressed air into a vehicle radiator to check for leaks in the radiator and related cooling system components or other devises.

Another object of the present invention incorporates 2 automatic safety valves to prevent over-pressurization which could occur with some prior art devices, resulting in serious damage to said cooling system and/or the operator. Care should always be taken when pressurizing a cooling system including appropriate clothing and eye protection.

Another object of the present invention utilizes adjustablity to meet desired criteria.

A further object of the present invention is to provide a pressure tester that is simple and convenient to use.

Still another object is to provide a pressure tester that is economical to manufacture.

Another novel object is being able to control the invention's valve housing in hand at a distance from the radiator filler neck, allowing the technician to locate possible leaks when they are distant from the said filler neck without repetitiously going back to the tool or manually pump to maintain said test air pressure until the leak is located.

These and several other objects are achieved by the following construction divulged and illustrated in the accompanying drawings, showing the novel features of this invention.

To the attainment of the above and associated objects, this invention may be embodied in the construction depicted in the accompanying drawings. However, attention should be called to the fact, that the drawings are illustrative only and that alterations may be made in the specific construction shown and described within the realm of the following claims.

BRIEF DESCRIPTION OF THE DRAWINGS

FIG. 2 is an exploded sectional view of the radiator pressure tester of FIG. 1, passages are not necessarily shown in their assembled location.

DETAILED DESCRIPTION

Figure 1:
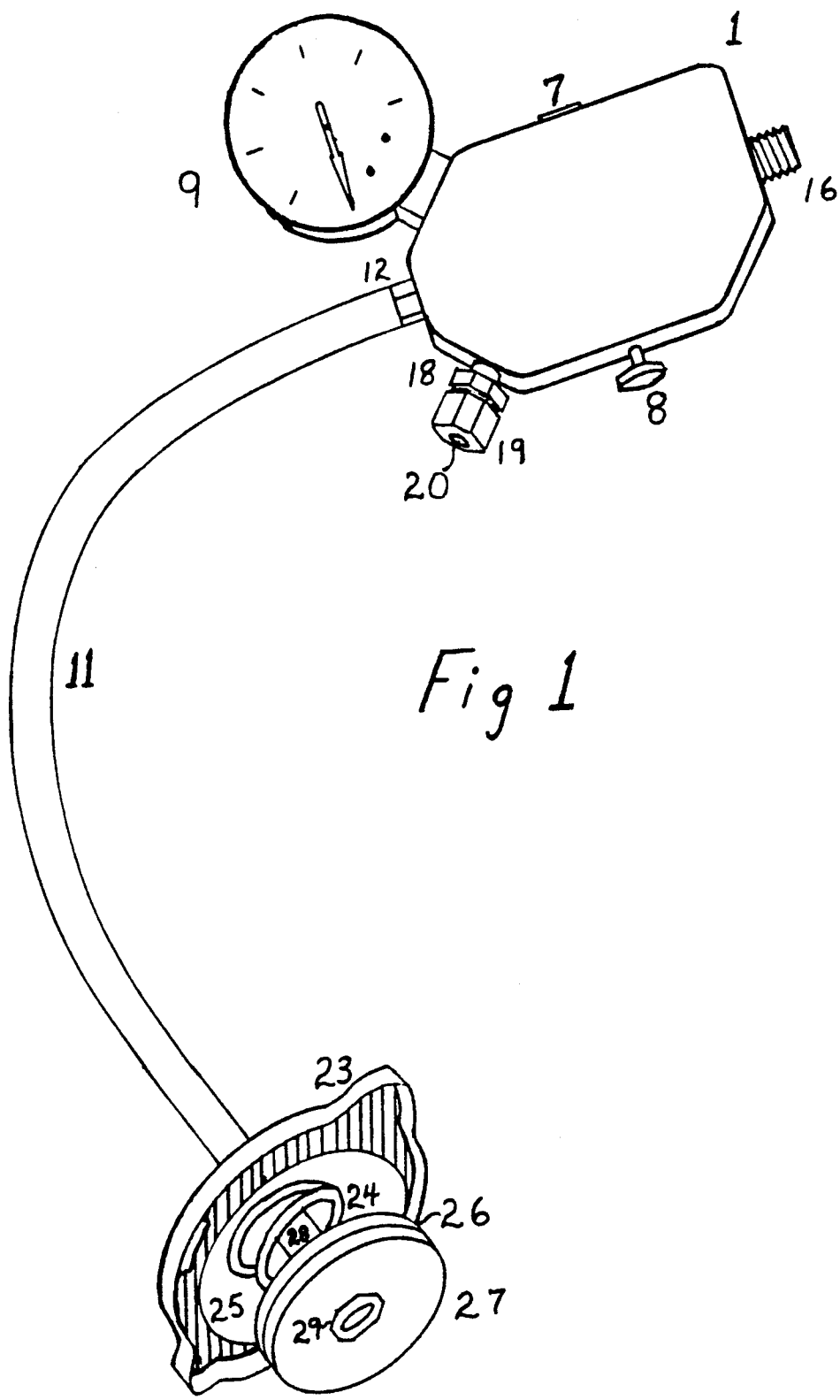
FIG. 1 is a perspective view of the novel radiator pressure tester of the present invention.

Using compressed air at a higher pressure than the test pressure, said compressed air enters valve assembly housing 1, fitting 16, which is designed to accept most shop compressed air connections, said compressed air running through a metered inlet orifice 2, (that is screwed in or machined part thereof) this metered compressed air runs into a pre-valve chamber 3, that is sealed by means of a check ball 4, seating firmly against a sealing ring 5, resting on a machined surface. Said check ball 4, being located most conveniently by a spring 6, device to hold it against its seat. A mechanical plug 7, allows tension on the spring 6, acting as a seal to the pre-valve chamber 3, and access to the valve mechanisms for repair.

When the valve assembly plunger shaft 8, is pushed by the operator, the inlet check ball 4, and seal 5, are separated, allowing compressed air through the metered inlet orifice 2, to enter the radiator side of the valve assembly housing passages. As the air goes past the check ball 4, into the passages 10, 13, 15, that lead to the gauge 9, a screw threaded safety valve 17, and outlet hose 11, to the radiator, this said metered pressure controlled compressed air is allowed into all above mentioned passageways, and to route itself via a flexible hose 11, which is connected to a radiator inlet adapter 22, in most cases, some other cases being available for different standard adapters. Said flexible hose 11, being connected with hose connections 12, in some applications and being supplied with a quick disconnect fitting, extended hose, and/or other applications adapters. When the cooling system has reached a pressure point sometimes rated at 16 p.s.i., air filling the ports on the radiator pressure side 10, of the valve check ball 4, and via. metered air flow into passage 13, operates the gauge 9, to show the technician the amount of pressure in the system, and through passage 15, operate a safety valve 17, said valve 17, consisting of body 18, threaded into a valve body and cap 19, threaded onto said safety valve body 18, with an air escape hole more than 2 times larger than before mentioned metered inlet orifice 2. Said cap 19, holding in place a pre-tensioned spring 20, holding a sealing plug 21, against the safety valve body 18, so as to regulate air pressure at approximately 16 p.s.i. or+or−4 p.s.i. (manually adjustable) which allows air to escape at a preset pressure i.e. in this particular case 16 p.s.i., at a rate faster then metered air can pass through the inlet side of the valve assembly housing 1, via. the metered inlet orifice 2.

When the operator is assured the radiator has reached the pressure and volume of air he requires for the particular test being run i.e. leakage, cracked cylinder head test, long time leak down test, or various radiator cap blow-off, and other tests. The operator then releases the valve assembly plunger shaft 8, or like mechanism which allows the inlet check ball 4, and sealing ring 5, to seat, stopping the flow of inlet air into the radiator side of the valve's assembly housing 1, passages. Said seating mechanism spring 6, being strong enough to push the check ball 4, so a seal is made thus preventing air pressure back-flow from the radiator side of the check ball 4, even if the outside compressed air source is disconnected.

The valve assembly plunger shaft 8, which operates the check ball 4, assembly is sealed at the small diameter of the shaft by an o-ring 14, that sits inside the machined valve assembly housing 1, passages, and seals the valve assembly plunger valve shaft 8, to outside air leakage. This holds pressurized test air sealed except for any leaks in the cooling system. By observing the gauge 9, the operator then being able to note any drop in pressure in the cooling system or other tested components, he/she can then be assured of the condition of the cooling system or other components.

The safety valve 17, being an integral part of the system being affixed via a passage 15, to the radiator outlet side of the valve assembly housing 1. Said safety valve 17, device can be fixed to one particular pressure or be adjustable via tension on the spring. Said test pressurized air, flowing from the valve assembly housing 1, through the outlet passage 10, into the flexible hose 11, and to the radiator inlet adapter 22, attachment allowing metered regulated air to blow into the cooling system or other tested components. Said radiator inlet adapter 22, consisting of an upper body 23, with flanged ears designed to hold it in place when installed on a radiator or other test device. A spring 24, to hold pressure and also allow a secondary pressure relief at approximately 20 p.s.i. when said device is attached for test purposes, an upper 25, and lower 26, spring backing plate which would center the sealing washer 27, on the radiator filler neck, or other adapter of various designs to allow the load of the spring 24, to be spread evenly and center the load from said spring 24, through lower spring backing plate 26, against the sealing washer 27, which sits against the sealing surface of the device to be tested. Going through the center of said sealing washer 27, and running up to a pressure inlet tube 28, to connection 12, from the flexible hose 11, coming from the valve assembly housing 1, the pressure inlet tube 28, sealed at the washer 27, by a nut 29, compressing sealing washer 27, against lower spring backing plate 26, via a fixed flanged keeper 30, and sealed at its connection 12, to the flexible hose 11, allowing the path for test air to flow through the radiator inlet adapter 22, into the cooling system or other test devices. Said spring 24, holding tension against the cooling system pressure inlet tube 28, using flanged keeper of upper body 23, to hold the top of the radiator inlet adapter 22, tight to cooling system inlet using spring 24, in between spring backing plates 25, 26, making sealing washer 27, under pressure and located centrally against inner lip of radiator inlet adapter 22, housing.

I claim:

1. A one hand operated pressure testing device for testing the entire vehicle engine cooling system, said pressure testing device comprising:
    a) a hand held valve assembly housing comprising:
        i) a standard thread inlet fitting on one end of the housing that will connect to a standard quick-disconnect fitting on most compressed air sources; and
        ii) a metering orifice in the housing at the inlet fitting designed to meter down the cubic feet per minute allowed into high pressure passages of the said valve assembly housing; and said passages connected to one side of
        iii) a hand controlled checks valve which holds a predetermined high pressure in the high pressure passages and the other side of the check valve connected to
        iv) low pressure passages leading to a gauge that registers the air pressure in said low pressure passages past the said check valve; and
        v) said low pressure passages also leading to a primary pressure relief valve manually set to open at a predetermined non-destructive pressure rate, that has a blow-off air flow greater than said inlet orifice will allow air into the said valve assembly housing of the invention; and
    b) low pressure outlet passage connecting low pressure passages to a flexible hose with the radiator test adapter being connected at the other end of said flexible hose:
    c) said radiator test adapter made to connect said flexible hose to the filler neck of a standard radiator:
        i) said radiator test adapter having a sealed passage for low pressure air to run from said valve assembly, through said hose, thus said air under pressure being discharged into said engine cooling system; and
        ii) a secondary pressure relief comprised of a spring pressed valve member set at a predetermined pressure, holding a seal at the mouth of the radiator filler neck.

2. A pressure testing device for vehicle radiators and cooling systems as recited in claim 1 wherein said valve assembly operates:
    a) by using an outside source of compressed air instead of the conventional hand pump:
    b) metering air flow with the inlet orifice down to a small volume (cubic feet per minute):
        i) said device works quickly, safely, and efficiently at pressurizing cooling systems; and
        ii) when said systems have a lack of fluid in them; and
        iii) if there is a leak above the cooling fluid in said cooling system; and
    c) means for pressurization of said cooling system so that pressurized air can be continually discharged into and maintained in said cooling system to check for leaks in said cooling system even when there is an internal or external crack in the engine cooling system being tested that are too large for said cooling system to be brought up to a test pressure.

3. A pressure testing device as recited in claim 2 that further includes means for preventing damage to said cooling system with a large margin of safety when testing said cooling systems comprising:
    a) said primary pressure relief valve in conjunction with:
    b) said secondary pressure relief radiator inlet adapter.
    c) said metered orifice:
        i) limiting the amount of air that can flow into the device.

4. A pressure testing device as recited in claim 3 that further includes means of measurement comprising:
    a) said pressure gauge:
        i) that registers the air pressure in said low pressure passages past the said flow stopping valve assembly; and
        ii) sensitive enough to show a drop in pressure; and
        iii) the accurate level of pressure attained to show the tightness or leakage of said cooling system being tested.

5. A pressure testing device as recited in claim 4 that further includes the means for the operator being able to physically place himself at a distance from this device's attachment point of said cooling system's radiator filler neck to check for leaks around the said entire engine cooling system from underneath the engine as well as inside the engine compartment comprising:
    a) an adequate length of said flexible hose separating the valve assembly from the radiator filler neck.

6. A pressure testing device as recited in claim 5 wherein said valve assembly through the use of a plunger shaft with said check valve further includes the means to allow the operator to re-meter said compressed air to be discharged into said cooling system for retest.

7. A pressure testing device as recited in claim 6 wherein said valve assembly through the use of the plunger shaft further includes the means to allow the operator to re-meter said compressed air to be discharged into said cooling system by depressing and holding down said valve assembly plunger shaft thus inducing a constant flow of regulated metered air pressure into said entire engine cooling system to maintain pressure for sustained testing.

8. A pressure testing device as recited in claim 7 wherein said plunger shaft further includes the means to allow the operator to vent said air pressure from said entire engine cooling system after testing by disconnecting said outside compressed air source, then depressing said plunger shaft thus releasing said air flow stopping valve allowing said cooling system's air pressure to back-vent through said device.

9. A pressure testing device as recited in claim 7 wherein said device has the capability to adapt to various environments using available adapters.

* * * * *